(12) United States Patent
Ferguson, Jr. et al.

(10) Patent No.: US 11,436,525 B2
(45) Date of Patent: Sep. 6, 2022

(54) ARTIFICIAL INTELLIGENCE RADIO TRANSCEIVER

(71) Applicant: Deepwave Digital, Inc., Philadelphia, PA (US)

(72) Inventors: John D. Ferguson, Jr., Philadelphia, PA (US); William M. Kirschner, New Market, MD (US); Peter E. Witkowski, Parker, CO (US)

(73) Assignee: DEEPWAVE DIGITAL, INC., Philadelphia, PA (US)

( * ) Notice: Subject to any disclaimer, the term of this patent is extended or adjusted under 35 U.S.C. 154(b) by 951 days.

(21) Appl. No.: 16/206,056

(22) Filed: Nov. 30, 2018

(65) Prior Publication Data

US 2019/0171965 A1 Jun. 6, 2019

Related U.S. Application Data

(60) Provisional application No. 62/593,342, filed on Dec. 1, 2017.

(51) Int. Cl.
*G06N 20/00* (2019.01)
*G06N 5/04* (2006.01)
(Continued)

(52) U.S. Cl.
CPC .............. *G06N 20/00* (2019.01); *G06N 5/04* (2013.01); *H04B 1/0003* (2013.01); *H04B 1/38* (2013.01)

(58) Field of Classification Search
CPC ........ G06N 20/00; G06N 5/04; H04B 1/0003; H04B 1/38; G06F 3/0656; G06F 3/0683;
(Continued)

(56) References Cited

U.S. PATENT DOCUMENTS 5,404,474 A * 4/1995 Crook ................. G06F 12/0223
711/212
9,344,128 B2 * 5/2016 Wollesen ................ H04B 1/16
(Continued)

FOREIGN PATENT DOCUMENTS

WO WO-2009083912 A2 * 7/2009 ........... H04B 1/0003

OTHER PUBLICATIONS

Oktay Ureten et al.; "Wireless Security Through RF Fingerprinting"; Can. J. Elect. Comput. Eng. vol. 32, No. 1, Winter, 2007; 8 pages.
(Continued)

*Primary Examiner* — Lana N Le
(74) *Attorney, Agent, or Firm* — Moore & Van Allen PLLC; Peter B. Stewart

(57) ABSTRACT

A software-defined radio system may include a radio frequency front end connected to a high performance computing processor comprised of a central processing unit (CPU), a graphics processing unit (GPU), and a shared memory between the CPU and GPU. The software-defined radio system may incorporate a signal processing unit between the radio frequency front end and the high performance computing processor. Additionally, the software-defined radio system may be configured to create a ring buffer in a shared memory between the CPU and GPU and directly store digital signal data in the ring buffer. The software-defined radio system may be used to implement and train machine learning algorithms and transmit digital signals.

9 Claims, 10 Drawing Sheets

Implementation of the Shared Memory Mechanism for the AIRT System 400

(51) Int. Cl.
*H04B 1/38* (2015.01)
*H04B 1/00* (2006.01)

(58) Field of Classification Search
CPC ........... G06F 2009/45583; G06F 9/544; G06F 5/065; G06F 12/0851; G06F 12/0246; G06F 13/1673; G06F 2212/251; G06F 12/084; G06F 3/067; G06F 9/3004; G06F 12/0802; G06F 2212/1008; G06F 2212/60; G06F 3/0614; G06F 9/5016; G06F 11/0724; G06F 15/17331; G06F 3/0679
See application file for complete search history.

(56) References Cited

U.S. PATENT DOCUMENTS

| | | | |
|---|---|---|---|
| 10,019,378 B1 * | 7/2018 | Alakuijala | G06F 12/1018 |
| 10,262,154 B1 * | 4/2019 | Kenthapadi | G06F 21/6254 |
| 10,282,811 B2 * | 5/2019 | Ray | G06T 1/20 |
| 2006/0015674 A1 * | 1/2006 | Murotake | H04B 1/406 711/101 |
| 2009/0323784 A1 | 12/2009 | Depienne et al. | |
| 2015/0222635 A1 * | 8/2015 | Yang | H04W 12/35 726/4 |
| 2015/0326702 A1 * | 11/2015 | Ames | H04M 1/03 455/556.1 |
| 2017/0000464 A1 * | 1/2017 | Chang | A61B 8/4483 |
| 2018/0102793 A1 * | 4/2018 | Talty | H04B 1/0035 |
| 2018/0373631 A1 * | 12/2018 | Tosaka | G06F 3/0659 |
| 2019/0354310 A1 * | 11/2019 | Tsirkin | G06F 3/065 |
| 2020/0274829 A1 * | 8/2020 | Suresh | G06F 3/0656 |
| 2021/0056051 A1 * | 2/2021 | Cooray | G06F 12/1009 |
| 2021/0117099 A1 * | 4/2021 | Faibish | G06F 12/0857 |

OTHER PUBLICATIONS

Yann Lecun et al.; Nature; "Deep Learning", vol. 521, May 28, 2015; 9 pages.
Kaipeng Li et al.; "Parallel Digital Predistortion Design on Mobile GPU and Embedded Multicore CPU for Mobile Transmitters"; 14 pages.
George Sklivanitis et al. ; Software Defined Radio : 20 years later ; Addressing Next-Generation Wireless Challenges with Commercial Software-Defined Radio Platforms 9 pages.
Ray Bittner et al.; "Direct GPU/FPGA Communication via PCI Express" Jun. 8, 2013, Springer Science + Business Media New York 2013.
Pengfei Xu et al.; "Performance Evaluation of Deep Learning Tools in Docker Containers"; 2017 3$^{rd}$ International Conference on Big Data Computing and Communications; 2017, 9 pages.

* cited by examiner

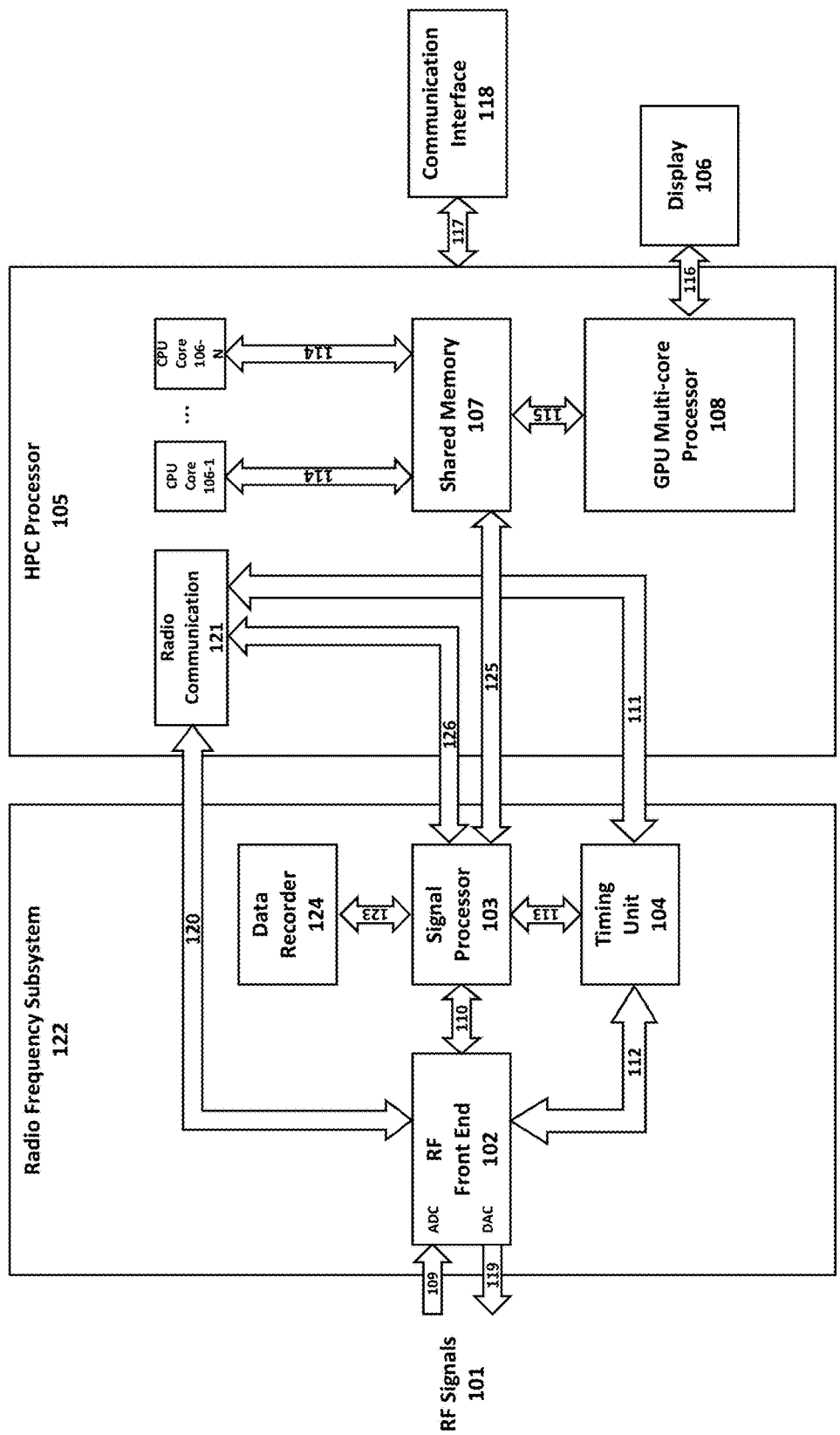
Figure 1: Artificial Intelligence Radio Transceiver (AIRT) System 100

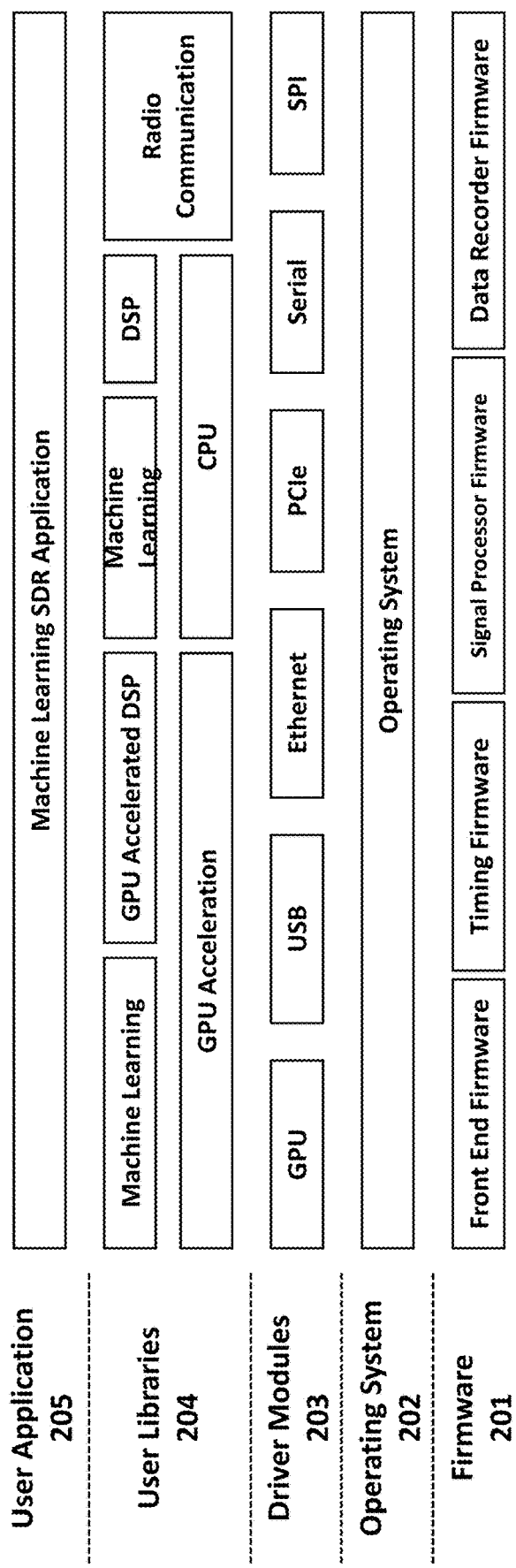
Figure 2: The AIRT System Software Stack 200

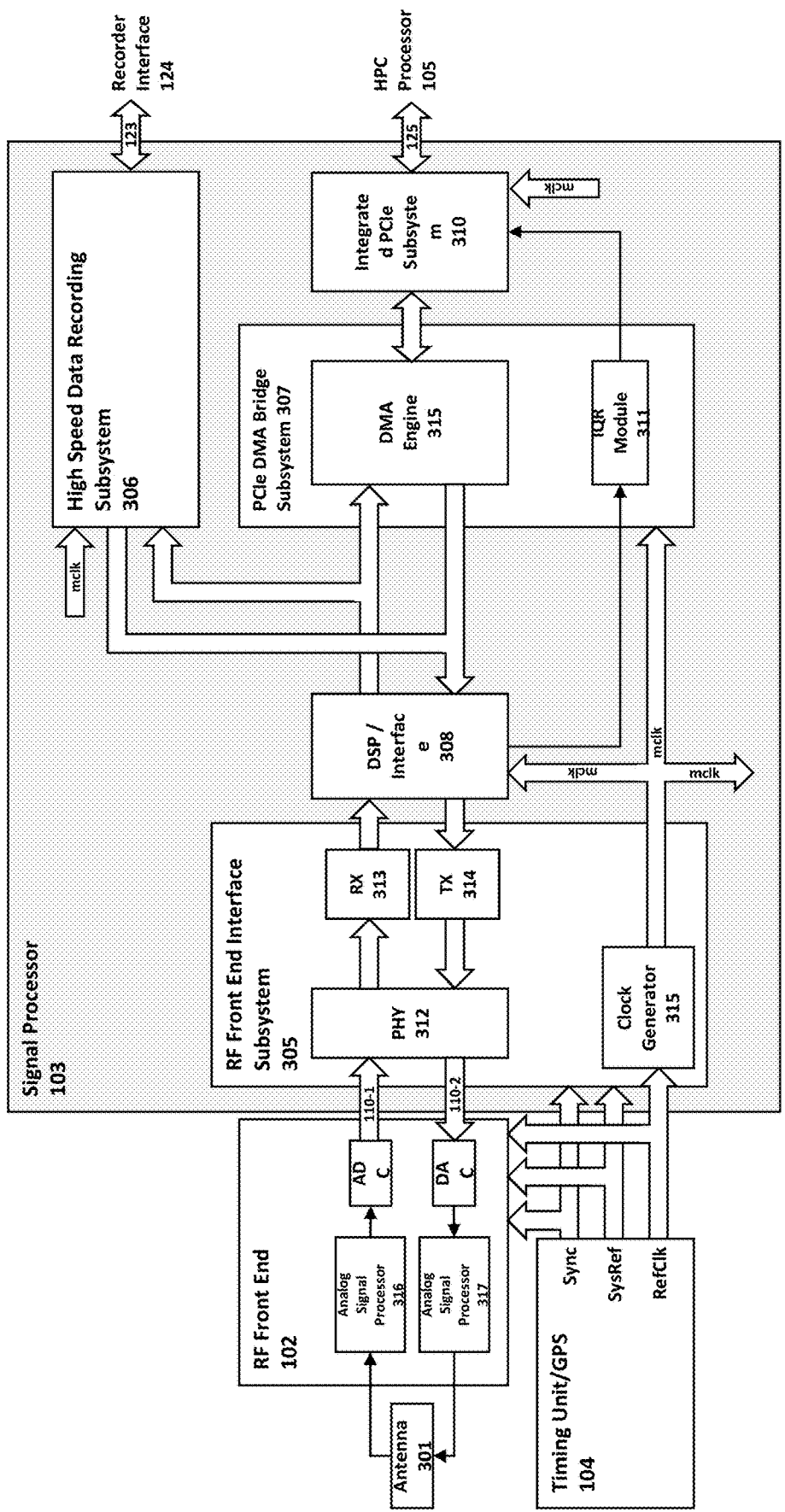
Figure 3: Firmware Implementation of the AIRT system's Signal Processor Module 300

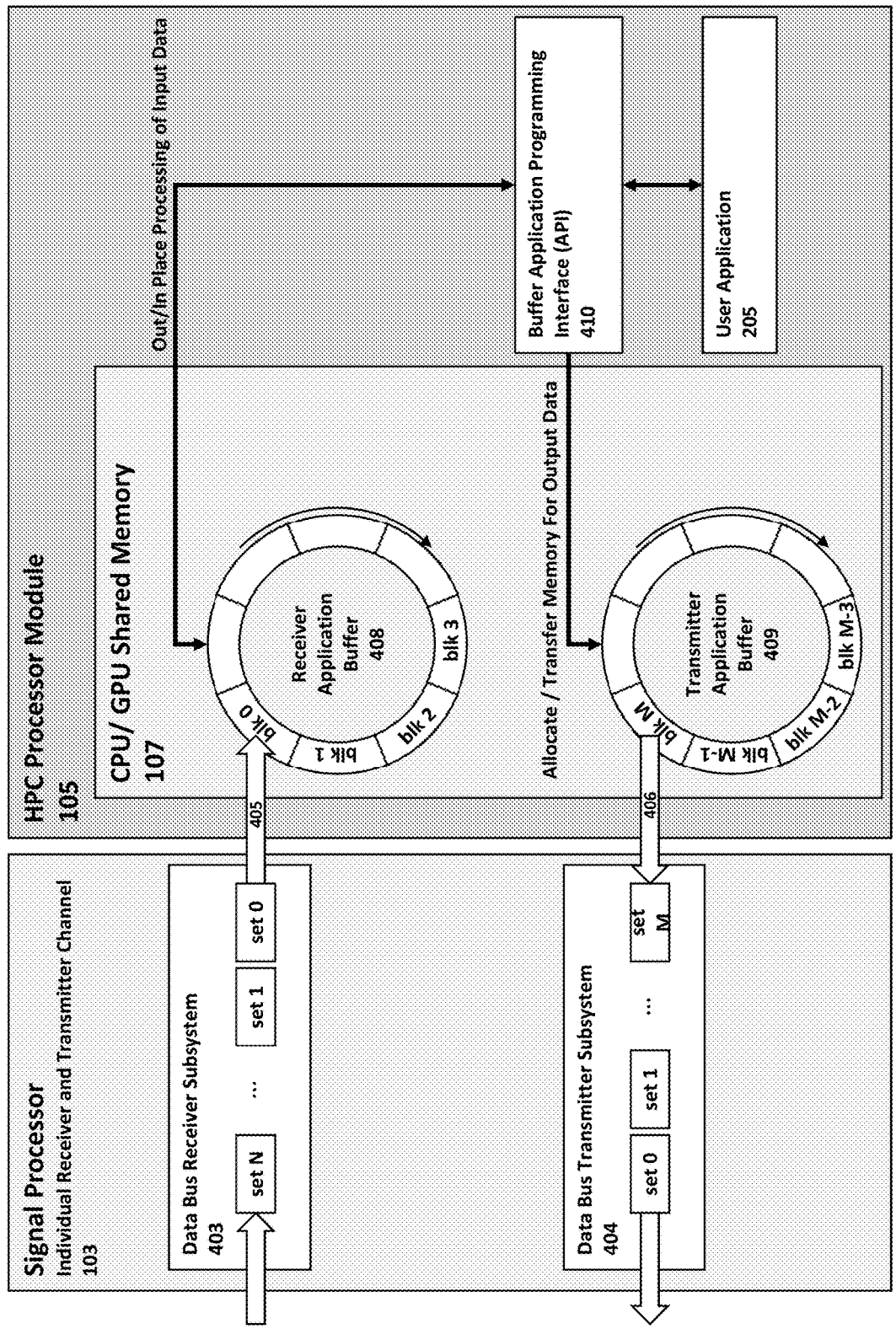
Figure 4: Implementation of the Shared Memory Mechanism for the AIRT System 400

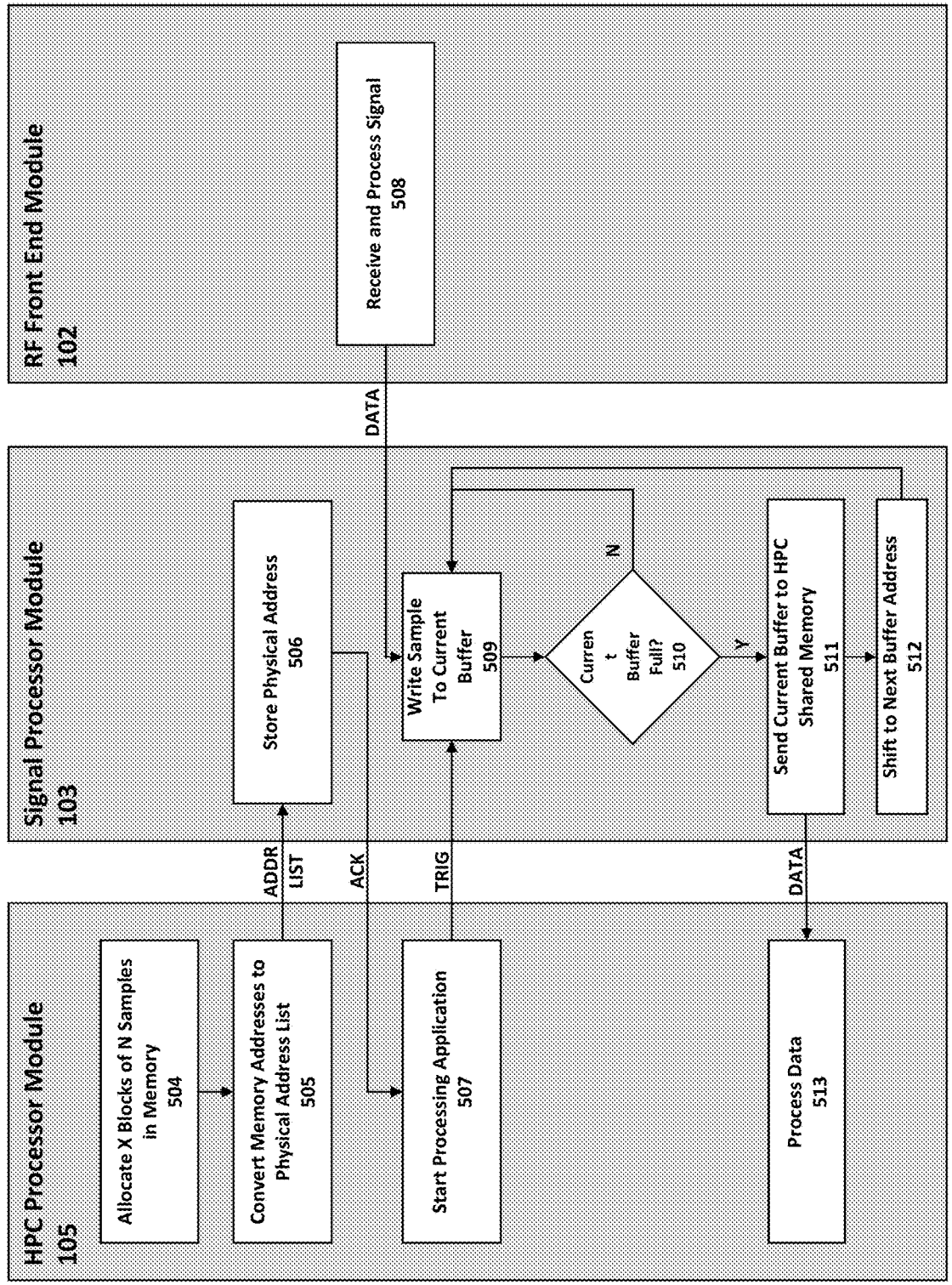

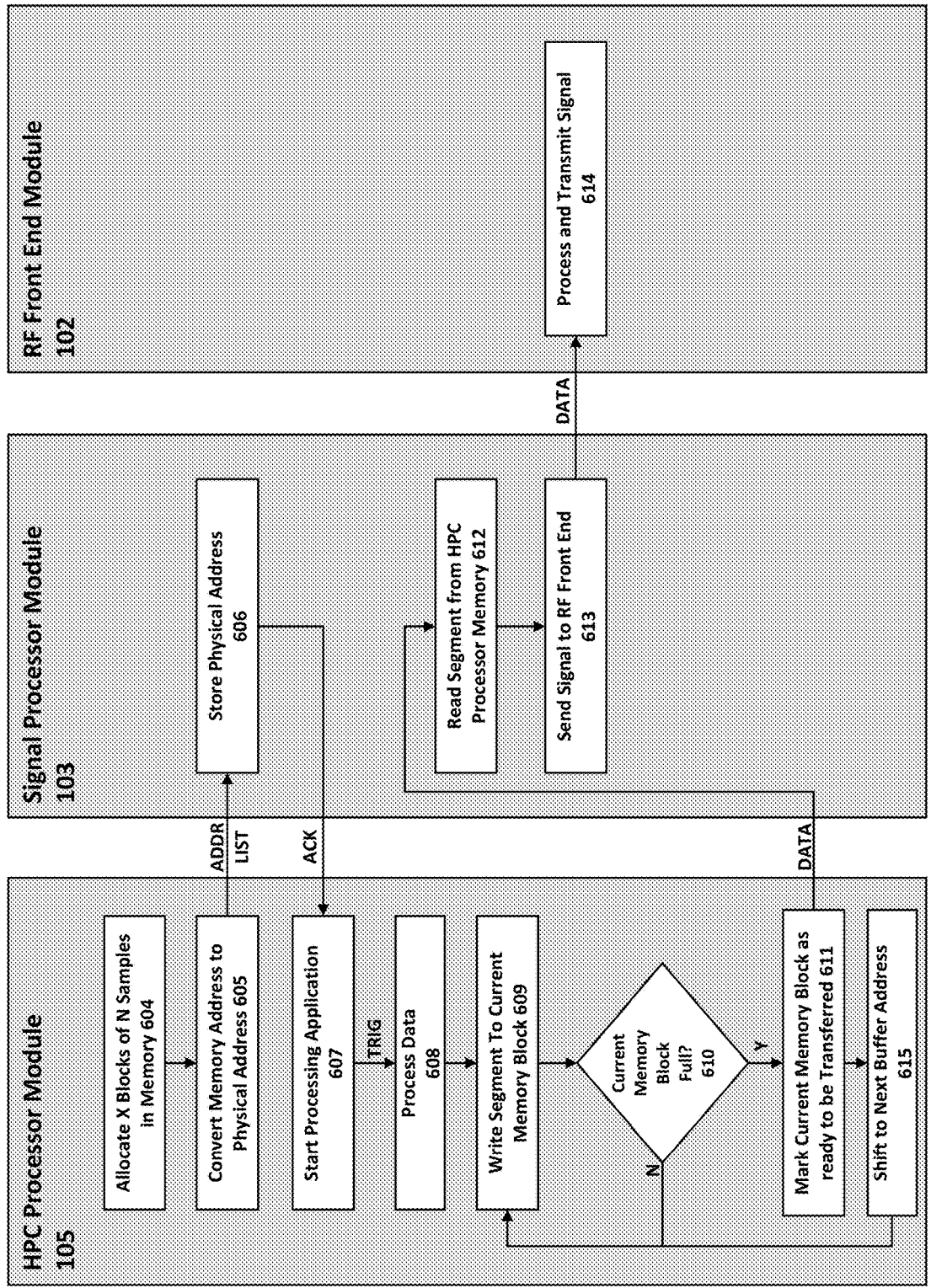
Figure 6: Shared Memory Implementation Algorithm for AIRT Transmitter 600

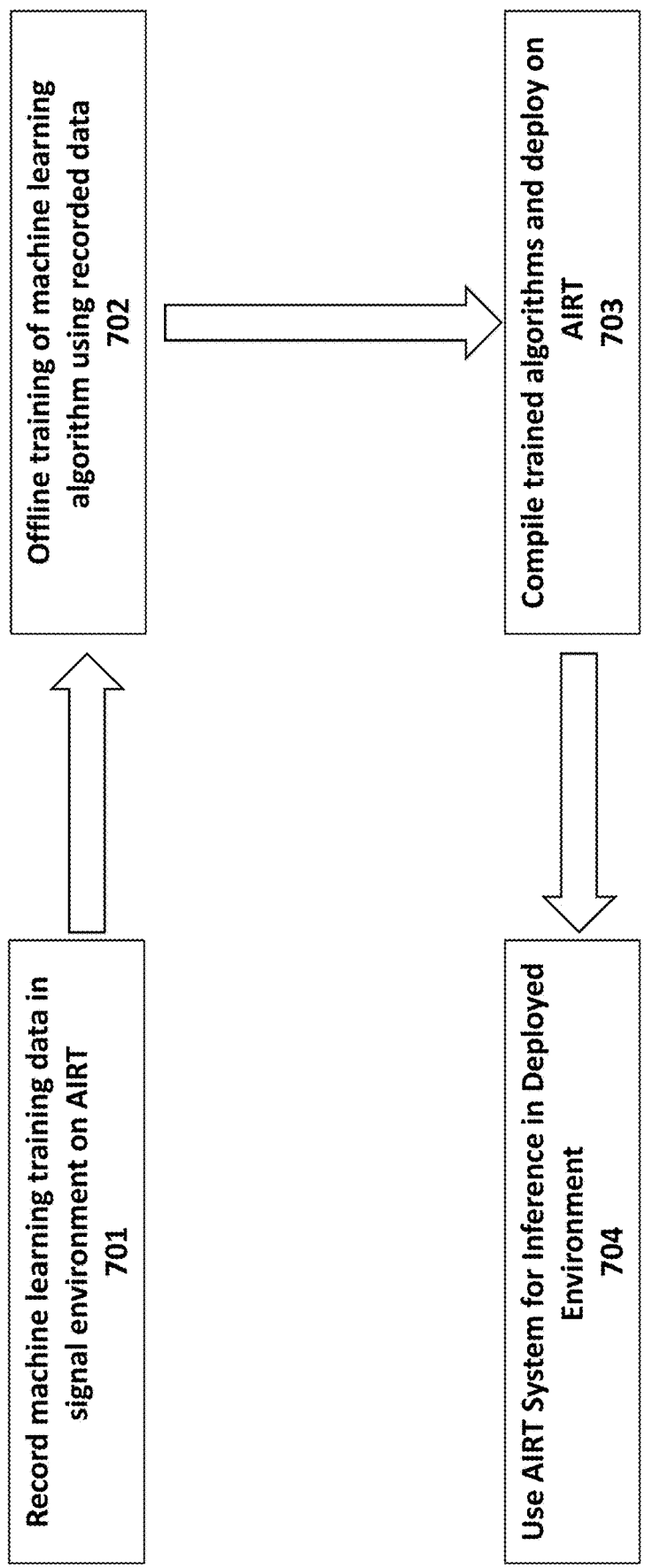
Figure 7: Inference Methodology for AIRT System

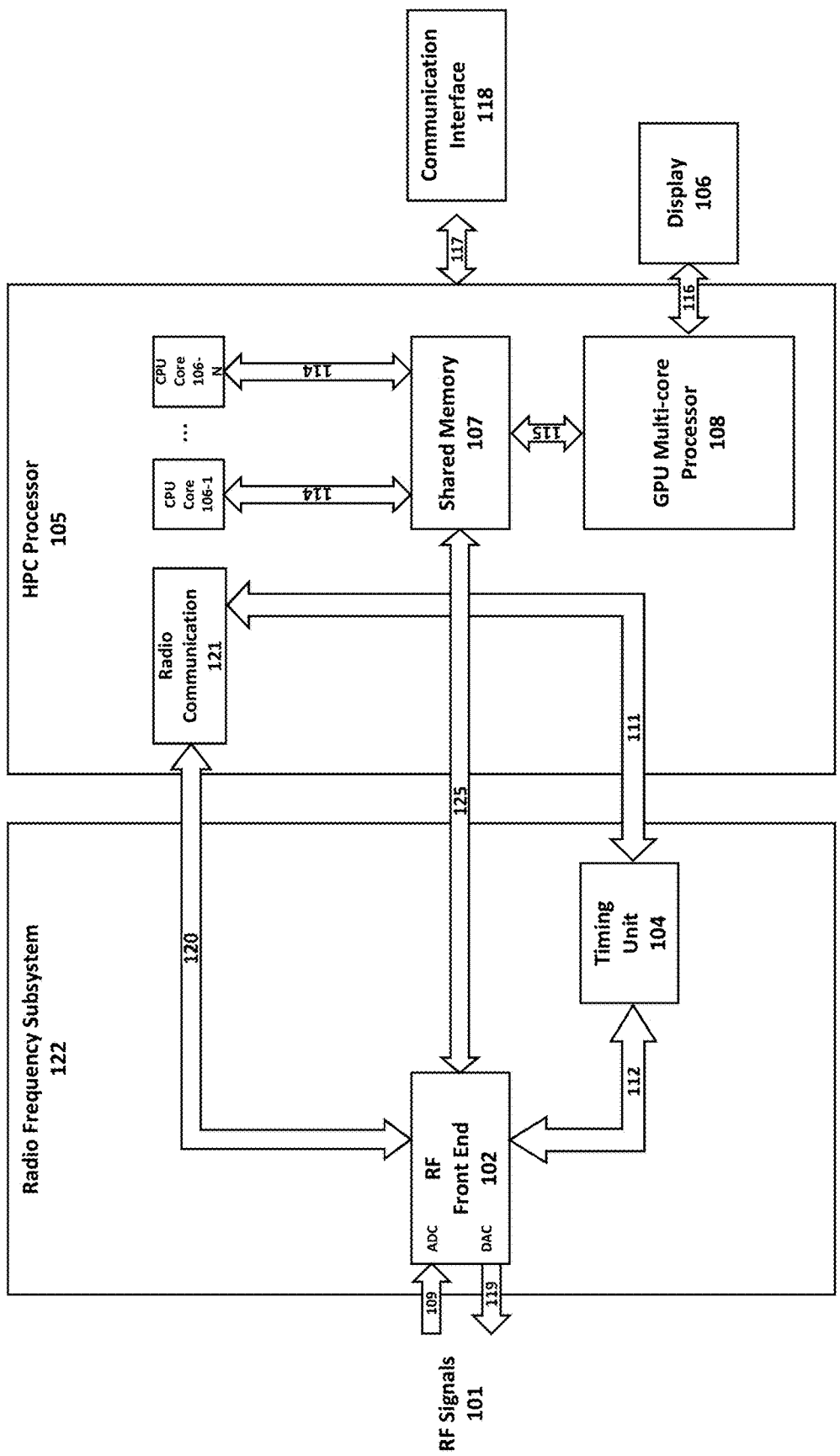
Figure 8: Artificial Intelligence Radio Transceiver (AIRT) System without Signal Processor 800

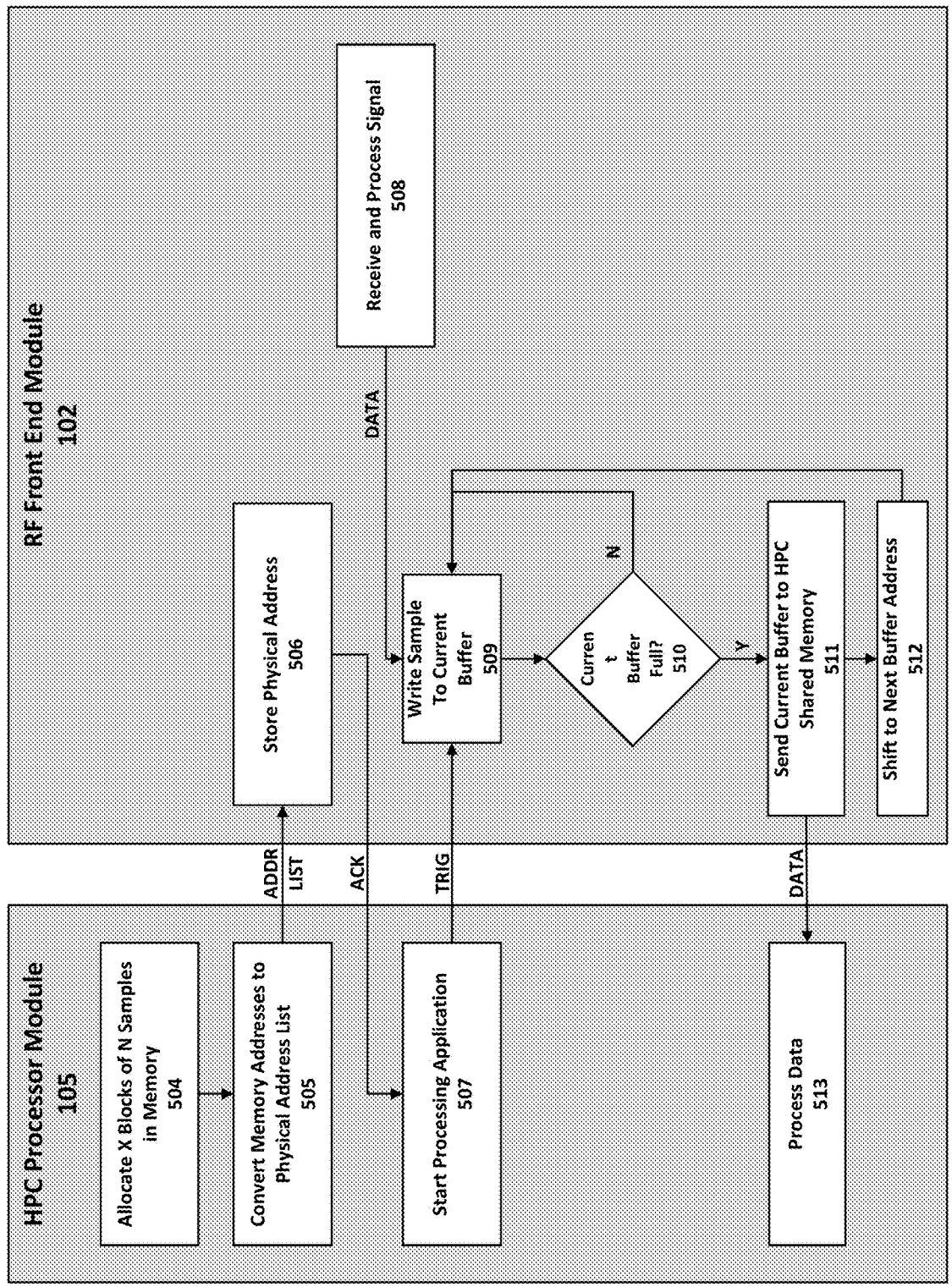
Figure 9: Shared Memory Implementation Algorithm for AIRT Receiver 500

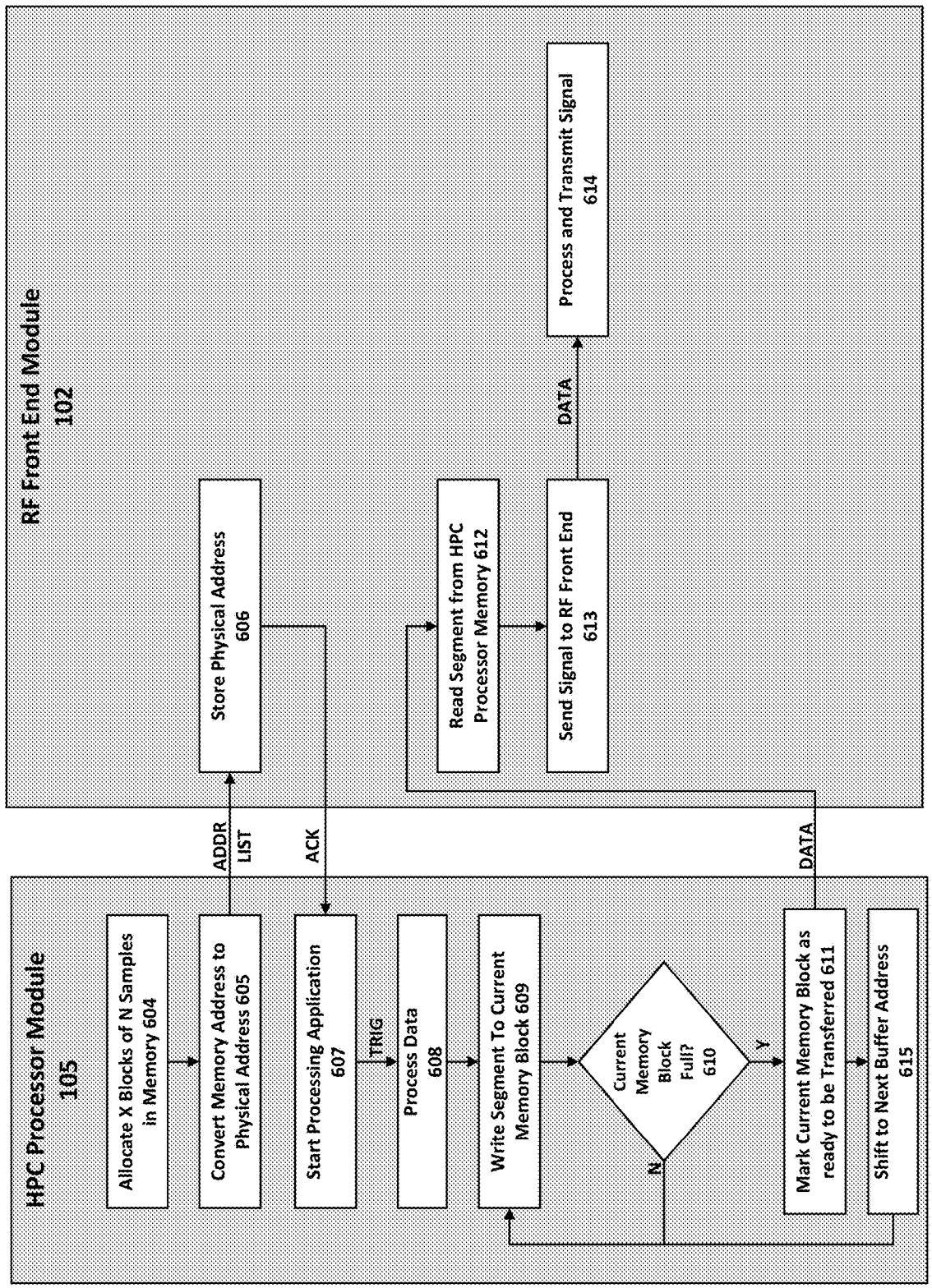
Figure 10: Shared Memory Implementation Algorithm for AIRT Transmitter 600

ARTIFICIAL INTELLIGENCE RADIO TRANSCEIVER

CROSS-REFERENCE TO PRIORITY APPLICATION

This application claims the benefit of U.S. Patent Application No. 62/593,342 for an "Artificial Intelligence Radio Transceiver" (filed Dec. 1, 2017), which is herein incorporated by reference in its entirety.

FIELD OF THE INVENTION

The present invention relates to software-defined radio systems that utilize graphics processing units and methods for implementing machine learning and artificial intelligence on the same.

BACKGROUND

Software-defined radio systems often employ a central processing unit in order to accomplish the digital functionality of the software-defined radio systems. Moreover, many software defined radio systems employ field programmable gate arrays, which require long development times and make it difficult to upgrade the software and firmware of the software defined radio system. Such existing software defined radio systems are ill-equipped for the combination of fast development and computationally intensive functions. Therefore, a need exists for an improved software defined radio system.

BRIEF SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the present invention relate to a software-defined radio system that comprises a high performance computing processor comprising a central processing unit, a graphics processing unit, and a shared memory accessible by the central processing unit and the graphics processing unit.

In some embodiments, a signal processor is communicatively coupled to the radio frequency front end and the high-performance computing processor, the signal processor being configured to receive digital signal data from the radio frequency front end and send the digital signal data to the high performance computing processor.

Alternative embodiments of the invention provide for the radio frequency front end to send digital data directly to the high performance computing processor.

Further embodiments of the invention may comprise a data recorder communicatively coupled to the signal processor, wherein the signal processor is configured to send, in parallel, the digital signal data to the data recorder and to the high-performance computing processor. In addition, in some embodiments of the invention, a signal processor is configured to store, via Direct Memory Access (DMA) or Remote Direct Memory Access (RDMA), the digital signal data in the shared memory of the high-performance computing processor.

Still further embodiments of the invention provide for the high-performance computing processor to be configured to (i) create a ring buffer comprising a plurality of blocks in the shared memory and (ii) transfer to the signal processor a list of addresses of the plurality of blocks of the ring buffer. In such embodiments, the signal processor is configured to directly store the digital signal data in the ring buffer of the shared memory of the high-performance computing processor.

In yet further embodiments of the invention, the signal processor is configured to store, via Direct Memory Access, the digital signal data in the ring buffer in the shared memory of the high-performance computing processor.

Embodiments of the invention as described above may comprise the radio frequency front end and the high-performance computing processor embedded on a common printed circuit board and/or electronically interconnected using one or more high-speed buses.

Additional embodiments of the invention as described herein relate to a method for recording machine learning training data and deploying a machine learning algorithm. The method may comprise receiving, via a software-defined radio system according to any of the above embodiments, digital signal data, recording the digital signal data on a memory of the software-defined radio system; training a machine learning algorithm using the recorded digital signal data; and performing, via the software-defined radio system, machine learning inference using the trained machine learning algorithm.

Further embodiments of the method may comprise transmitting a response digital signal, wherein the digital signal is determine by the machine learning inference.

In further embodiments of the method, the trained machine learning algorithm may update during the performance of machine learning inference.

Still further embodiments may comprise recording the digital signal data on the shared memory accessible by both the central processing unit and the graphics processing unit.

BRIEF DESCRIPTION OF THE FIGURES

FIG. 1 depicts an architecture implementation of the artificial intelligence radio transceiver (AIRT) system including a signal processor according to embodiments of the invention as described herein.

FIG. 2 depicts a software stack for the AIRT system according to embodiments of the invention as described herein.

FIG. 3 depicts a firmware implementation of the signal processor module in the AIRT system according to embodiments of the invention as described herein.

FIG. 4 depicts a shared memory mechanism for the AIRT system utilizing a "ring-buffer" architecture according to embodiments of the invention as described herein.

FIG. 5 depicts a logic flow algorithm for implementing the shared memory architecture for the AIRT Receiver according to embodiments of the invention as described herein.

FIG. 6 depicts a logic flow algorithm for implementing the shared memory architecture for the AIRT Transmitter according to embodiments of the invention as described herein.

FIG. 7 depicts a process flow for implementing artificial intelligence and machine learning processes on the AIRT system according to embodiments of the invention as described herein.

FIG. 8 depicts an architecture implementation of the AIRT system without a signal processor according to embodiments of the invention as described herein.

FIG. 9 depicts a logic flow algorithm for implementing the shared memory architecture for the AIRT Receiver according to embodiments of the invention without a Signal Processor Module as described herein.

FIG. 10 depicts a logic flow algorithm for implementing the shared memory architecture for the AIRT Transmitter according to embodiments of the invention as described herein.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

As described in greater detail herein, embodiments of the present invention relate to software-defined radio systems that leverage the capabilities of a high performance computing processor and a graphics processing unit with a shared memory to perform machine learning and other highly-parallel algorithms on radio frequency signal data. The systems and methods described herein may be performed on architecture that includes or omits a signal processor.

Typically, an RF transceiver system is comprised of one or more analog-to-digital converters (ADCs), one or more digital-to-analog convertors (DACs), and digital processing hardware components to process the digitized data. The processing components are traditionally FPGAs; however, some systems employ multi-core CPUs enabling the system to manipulate the digitized data using software libraries, thereby reducing development time compared to FPGA implementations. However, FPGA implementations will allow for a system with greater processing bandwidth. When the digital signal processing algorithms are implemented in software, the RF transceiver system is referred to as a software-defined radio (SDR). While FPGA based systems are desirable for applications with a high bandwidth/data rate or applications with low latency requirements, these systems are designed with a feed forward methodology, e.g., the data flows continuously and predictably through various signal processing stages. Some SDR transceiver systems break the paradigm by allowing for the interplay of non-deterministic digital signal processing (DSP) software; however, the throughput of DSP and machine learning (ML) algorithms (many of which are extremely parallel in nature) is limited by the number of CPU cores in the system. That is, the performance of many DSP and ML algorithms improves as the number of cores in a processor is increased, leading to the need for more processing cores than possible with current CPU architectures.

With the advent of the general-purpose GPU, highly parallel and complex computations (such as those performed during DSP or ML) are achievable in real-time. U.S. Patent Application Publication No. 2009/0323784 (the '784 publication), discloses a software defined radio platform utilizing a GPU. However, the '784 publication does not describe using such a software defined radio platform for RF machine learning applications. Additionally, the software-defined radio platform described in the '784 publication has various issues regarding memory management. Namely, many of the data transfers between the RF transceiver and the GPU require CPU involvement, which greatly reduces overall system throughput and bandwidth causing a major limitation in the applicability of the work to modern wireless technology.

In artificial intelligence (AI) systems, universal ML algorithms are pseudo-autonomously "trained" (i.e., the algorithm's hyperparameters must be initially set by a programmer) to produce a desired effect by modifying various weights, biases, and other variables. Yann Lecun, Yoshua Bengio, Geoffrey Hinton, *Deep Learning*, Nature, 521, 436-444 (2015), which is hereby incorporated by reference in its entirety, provides additional information regarding machine learning algorithms. This training process is executed by 1) feeding training data through the machine learning algorithm, 2) judging how the algorithm's output differs from the desired output (error), and 3) modifying the weights, biases and other variables to minimize this error thereby making the algorithm more accurate. The ML algorithm is further trained by repeating this process until the algorithm's output is nearly identical to the desired output. After the algorithm is trained, it may be deployed on a system for field operation, a process referred to as inferencing. Machine learning algorithms are highly parallelizable and therefore the general-purpose GPU utilized by the present invention significantly decreases the execution time of the training and inferencing processes while allowing for the benefits of the highly adaptable nature of the SDR.

Herein, the term machine learning is broadly used to include, but not be limited to, artificial intelligence algorithms, deep learning, supervised learning, unsupervised learning, reinforcement learning, artificial neural networks, Bayesian networks, representation learning, and/or other algorithms associated with AI.

Current software defined RF systems utilizing CPUs for processing are not equipped to handle the computationally intensive machine learning algorithms, due to near complete utilization of computational resources. Additionally, software defined RF systems utilizing FPGAs for processing suffer from long development time leading to rigid software/firmware upgradability, limiting usage in dynamic research areas, such as machine learning. The invention described here is capable of utilizing a GPU for machine learning computations in combination with using a FPGA (or other signal processor) and/or CPU for digital signal processing, thereby avoiding limitations of CPU- and FPGA-only architectures, as described above.

To address these problems, the present invention is directed to an Artificial Intelligence Radio Transceiver (AIRT) system, which is a hardware architecture designed to facilitate the combining of a traditional RF transceiver system with the processors for performing machine learning. The AIRT system facilitates the native execution of highly parallel ML algorithms on a SDR system by combining one or more digital processors (which may include a digital RF processor such as an FPGA, a multi-core CPU, or a general-purpose GPU) with a radio transceiver front end (which may or may not be packaged with one or more of the digital processors on a single integrated circuit). Exemplary embodiments of the system accomplish this by embedding an RF transceiver, FPGA, CPU, and GPU on a common printed circuit board, and utilizing a unique software stack and memory management logic, allowing for efficient DSP and ML algorithms to be applied directly to the raw received and transmitted signals as well as the signal's data products (e.g., audio for two-way radios, TCP/IP packets for Wi-Fi, or any other data product/protocol pair). Alternative embodiments of the AIRT architecture may include a different set of discrete processors or System on a Chips (SoCs) as the state of the art evolves. Efficient application of AI processing of RF signals is facilitated by the incorporation of both DSP and ML algorithms. The ability to utilize the GPU for parallel DSP algorithms further enables the coupling of the DSP and machine learning algorithms.

Overview

Described herein is an Artificial Intelligence Ratio Transceiver (AIRT) software defined radio system designed to enable streamlined high-performance computing (HPC) and machine learning algorithms to be applied directly to RF signals and/or the RF signal's data content. The system is typically implemented in an embedded architecture with optimizations (e.g., use of a shared memory architecture as described herein) implemented to minimize latency (compared with previous implementations of GPU enabled software defined radio systems) and data transfers, which facilitates high bandwidth real-time applications.

While the AIRT system is described in general implementation terms, specificity is provided for the exemplary system design without loss of generality.

Architecture Implementation

System Functional Operation

FIG. 1 and FIG. 8 illustrate two exemplary architectures of the AIRT SDR system described herein. Generally, the system may operate as a receiver-only, as a transmitter-only, or as a transmitter and receiver (transceiver). The system may have multiple transmitter and multiple receiver channels that need not be identical in capability or identical in the operational settings (e.g., they operate in parallel and independently and are individually configurable). FIG. 1 depicts the AIRT System (100) implemented with a Signal Processor Module (103) and a Data Recorder Module (124), while FIG. 8 depicts the AIRT System implementation without the Signal Processor Module (103) or Data Recorder Module (124), though it should be understood that some embodiments may incorporate a Data Recorder Module (124) connected to the RF Front End (102). Unless specifically noted herein, the architecture described in FIG. 1 and FIG. 8 will be used interchangeably to describe the AIRT system and either implementation may achieve all of the functionality as described herein.

Referring now to FIG. 1, when the AIRT system (100) is operating as a receiver-only, analog RF Signals (101) enter the system via the interface (109). This interface is connected to the RF Front End Module (102), which may perform frequency conversion, filtering, down-sampling, or any other analog or digital processing operation. The RF Front End Module (102) typically performs an analog to digital (ADC) conversion of the received RF Signal (101). The RF Front End Module (102) typically obtains its frequency reference from the Timing Unit (104) and may be controlled via the Radio Communication Module (121). The Radio Communication Module (121) may be executed on the HPC Processor Module (105).

The RF digital signal data may be streamed from the RF Front End Module (102) to the Signal Processor Module (103) where additional processing takes place. Also, here individual samples from the data stream may be combined into packets (packetizing). The Signal Processor Module (103) receives its timing and frequency reference via the Timing Unit (104). If commanded, the Signal Processor Module (103) may send the sampled RF digital data to the Data Recorder Module (124), for recording to disk, without impacting the ability to send data to SDR applications on the HPC Processor Module (105) (i.e., this same data can be sent across a data bus (125) by the Signal Processor Module (103) to the HPC Processor Module (105) in parallel). Some implementations of the radio Frequency Subsystem (122) may combine the RF Front End (102) with the Signal Processor (103) in to a single subsystem.

Other implementations of the AIRT may eliminate the Signal Processor (103) subsystem entirely thereby allowing the RF Front End 102 to transfer the digital data directly to the HPC Processor Module (105). If the Signal Processor (103) is eliminated, the RF Front End 102 and/or the HPC Processor Module (105) may be configured to perform the functionality of the Signal Processor (103) described herein. Such as an implementation is depicted in FIG. 8 and described in more detail throughout this disclosure.

In any implementation of the RF Subsystem, the RF Subsystem (122) typically streams the RF digital signal data across the data bus (125) to the Shared Memory Module (107) on the HPC Processor Module (105). Once the RF digital signal data is successfully transferred to the Shared Memory Module (107), it is equally accessible by the Multi-core CPUs (106) or the GPU Multi-Core Processor (108). The RF digital signal data is stored in the memory shared by the GPU and CPU eliminating unnecessary memory copies typically associated with GPU processing. SDR applications are implemented on the HPC Processor (105) and may utilize the Multi-Core CPU (106) or the GPU Multi-Core Processor (108) to process the digital RF data. The SDR applications may also send the data back to the Signal Processor (103) (in embodiments where the Signal Processor (103) is implemented on the architecture) for additional processing. The SDR applications may also utilize the GPU Multi-Core Processor to render the data for a user Display (106). The SDR applications may communicate and/or send data to external devices via the Communication Interface (118).

When operating as a transmitter-only, the RF digital signal data may be generated by the HPC Processor (105) or played back from pre-recorded signals via the Communication Interface (118). If the architecture is such that the Signal Processor (103) is included, the RF digital signal data may be synthesized in the Signal Processor (103) under the control or not under control of the HPC Processor (105), or played back from pre-recorded RF signal data via the Data Recorder Module (124). If the data is generated by the HPC Processor Module (105), or if the data is streamed via the Communication Interface (118), the digital samples will reside or pass through in the GPU/CPU shared memory. In these case where the Signal Processor (103) has been included, the RF data samples to be transmitted typically will be sent across the data bus (125) to the Signal Processor Module (103). Should the implementation of the Radio Frequency Subsystem (102) be such that the Signal Processor Module (103) is not present, the RF data samples to be transmitted typically will be sent across the data bus (125) to directly to the RF Front End Module (102).

If the data is being played back via the Data Recorder Module (124), the digital RF data will enter the Signal Processor Module (103) via the Data Recorder Interface (123). Once the signal to be transmitted exits the Signal Processor Module (103), all three mechanisms for transmitting data follow the same data path. The Signal Processor Module (103) may perform signal processing and/or packetizing to stream the digital samples across the Serial Data Bus (110) to the RF Front End Module (102). The RF Front End Module (102) may perform additional signal processing, digital-to-analog (DAC) conversion, followed by frequency conversion to the frequency desired for radio transmission. The RF Front End Module (102) obtains its frequency reference from the Timing Unit (104) and is controlled via the Radio Communication Module (121) (e.g., radio communication software). The Radio Communication Module (121) is executed on the HPC Processor Module (105). Once the analog signal to be transmitted leaves the RF Front End Module (102), the signal is sent over the Analog Path (119) for analysis and/or transmission.

The AIRT system may also operate in a transceiver mode. In the transceiver mode, both of the above methods, transmitter-only and receiver-only, are combined so that the system can simultaneously transmit and receive signals. In transceiver mode, in addition to the previously mentioned methods of obtaining signal data for transmission (e.g., generating the transmission signal on the HPC Processor (105), playing back pre-recorded signals via the Communication Interface (118), or playing back pre-recorded RF signal data via the Data Recorder Module (124)), the system may derive the signal to be transmitted from the received signal. This may include data manipulation, frequency conversion, modulation type, data response, or any other method of deriving a response signal from the received signal.

In the following sections, each module in FIG. 1 and FIG. 8 is individually described in detail. It should be noted that each of these modules can be implemented either as discrete components or combined together in a single integrated circuit (e.g., in the case of a SoC). For example, the RF Front End Module (102) and Signal Processor Module (103) can be combined into a SoC or be implemented as two separate discrete modules. Additionally, the HPC Processor Module (105) may be broken up into its discrete components where the CPU and GPU are comprised of separate integrated circuits (or "chips") or the module itself can be a SoC.

RF Front-End Module 102

As alluded to above, embodiments of the present invention can transmit and receive signals simultaneously, but may also operate in a transmit-only or receive-only modes. If the system is receiving data, the signal data travels to the RF Front End (102) via the Analog Receiver Connection (109). When receiving signals, the RF Front End Module (102) receives the RF signal via the Analog Receiver Connection (109) and typically down-converts the RF signal to a baseband signal or an intermediate frequency (IF) signal and then digitizes the signal via an analog to digital converter. The frequency tuning value for the conversion may be controlled via the Radio Communication Module (121) residing on the HPC Processor Module (105). The RF Front end may implemented as direct sampling, direct conversion, superheterodyne, dual conversion superheterodyne, or any other digital transmitter, receiver, or transceiver class.

When the RF Front End Module (102) is receiving signals, the down-converted digital RF signal data is typically sent from the RF Front End Module (102) to the Signal Processor Module (103) via the Data Bus (110), which may be a high-speed serial interface that is compliant with the JESD204B protocol.

In FIG. 1, when transmitting a signal, the digital data is typically received via the Data Bus (110). In FIG. 8, when transmitting a signal, the digital data is typically received via the Data Bus (125). Following this step in either case, signal processing may be performed, followed by sending the RF digital data to a digital to analog converter. This analog baseband or IF signal may then be converted in frequency to the desired RF and output through the Analog Transmitter Connection (119) which may be a cable connection to an antenna, a power amplifier, or to other signal processing or analysis hardware. The frequency tuning value for the conversion and other parameters of the RF Front End Module (102) are controlled via the Radio Communication Module (121) residing on the HPC Processor Module (105).

All command and control of the RF Front End Module (102) is typically executed by the Radio Communication Module (121) via the Communication Bus (120). In some embodiments of the invention, the Communication Bus is implemented as a Serial Peripheral Interface (SPI) Bus. The Radio Communication Module (121) resides within the HPC Processor Module (105). The commands sent across the Communication Bus (120) may set the RF Front End Module's (102) center frequency, gain, and/or any other controllable parameter.

The RF Front End Module (102) typically obtains its frequency reference via the Analog Interface (112) from the Timing Unit Module (104). If desired, the Timing Unit Module (104) may have the ability to synchronize to the Global Positioning System (GPS) and synchronize the AIRT system's time and frequency reference to the GPS constellation. This frequency reference from the Timing Unit Module (104) is used to synchronize the local oscillator (LO) on the RF Front End Module (102) to a standard frequency.

The RF Front End Module (102) may perform filtering, decimation, up-sampling, down-sampling, and/or any other digital processing operations on the analog and digital RF signal data.

Timing Unit Module 104

In exemplary embodiments, the Timing Unit Module (104) uses its own internal oscillator which may or may not be disciplined to a satellite navigation system such as GPS, Galileo, GLONASS, or other satellite positioning system. Herein, satellite positioning systems are generically referred to as GPS. The Timing Unit Module (104) may send a frequency reference to the RF Front End Module (102) for precise tuning of the transmit and/or the receive radio frequency and phase. The Timing Unit Module (104) may send the frequency and timing reference to the Signal Processor Module (103), if present, via an analog interface (113). The Timing Unit Module 104 may send the measured time to the HPC Processor Module (105) via a data interface (111). Interface 111 is implemented in some embodiments as a serial interface, but may be implemented as other protocols.

The value of the measured time sent across interface 111 may be GPS time. If GPS is unavailable, or if the system is not utilizing GPS for disciplining of clocks, then interface 111 will not be utilized by the Radio Communication Module (121). Instead, the Radio Communication Module (121) can read a "mission time" referencing the amount of time elapsed since the system was powered on from the Signal Processor Module (103) over interface 126. If the Signal Processor Module is not present, the "mission time" may be obtained from the Timing Unit (104) via interface 111. If GPS time is provided, the Radio Communication Module (121) can pass along this time to the Signal Processor Module (103) over interface 126 such that both the HPC Processor (105) and Signal Processor Module (103) will share a common time, which is helpful for applications where certain operations are commanded to begin at specific times of day (e.g., "begin receiving signals at midnight").

When the system is transmitting, the Signal Processor Module (103) may use the time it was synchronized to by the Radio Communication Module (121) as a way to transmit data at an exact time. The time of transmission is controlled via the Radio Communication Module (121) and passed over the Signal Processor Control Interface (126).

When the system is receiving, the Signal Processor Module (103) may use its internal time as a way to timestamp the RF data and therefore provide valuable metadata to the HPC Processor (105). If the Signal Processor Module (103) was previously synchronized by the Radio Communication Module (121), this timestamp may be the GPS time, otherwise it may simply be a value of elapsed time since the unit was powered on. Additionally, the Signal Processor Module (103) may use the time it was synchronized to by the Radio Communication Module (121) as a way to receive data at an exact time. The time that the signal is supposed to be received is controlled via the Radio Communication Module (121) and passed over the Signal Processor Control Interface (126). This is useful in applications where it is desirable to synchronize data received across multiple SDR devices.

Signal Processor Module 103

The Signal Processor Module (103) may include a field programmable gate array (FPGA) chip with various data transfer and communication interfaces, however other digital processors such as an application-specific integrated circuit (ASIC) may be utilized or any other class of signal processor.

When the RF Front End Module (102) is receiving signals, the Signal Processor Module (103) typically receives the digital signals from the RF Front End Module (102) via the Data Bus (110). In some embodiments of the invention, the Data Bus (110) is a high-speed serial interface that is compliant with the JESD204B protocol, however other implementations for Data Bus (110) are possible.

The Signal Processor Module (103) may perform additional DSP (e.g., filtering, frequency conversion, demodulation, etc.) on the received RF digital signal. The Signal Processor Module (103) may packetize and time stamp the digital signal data. Timestamps may be computed by counting the PPS rising edges provided by the Timing Unit (104) over the analog interface (113). If the Signal Processor Module (103) was previously synchronized by the Radio Communication Module (121), this timestamp may be the GPS time (which the HPC Processor obtained from the Timing Unit (104) over interface 111), otherwise it may simply be a value of elapsed time since the unit was powered on. The Signal Processor Module (103) then sends RF digital data and associated metadata (which may include timestamps or signal parameters such as center frequency, bandwidth, etc.) across the Data Bus (125) to the Shared Memory Module (107) on the HPC Processor Module (105) for processing by the SDR, DSP, and/or ML applications. The data transfer may be accomplished via Direct Memory Access (DMA) or Remote Direct Memory Access (i.e., the Signal Processor Module (103) implements a DMA or RDMA controller), and the Data Bus (125) may be implemented as a PCIe Interface. When the RF Front End Module (102) is transmitting signals and the signal to be transmitted resides in the Shared Memory Module (107) of the HPC Processor Module (105), signal data is transferred over the Data Bus (125) from the HPC Processor (105) to the Signal Processor (103). In exemplary embodiments, a DMA controller on the Signal Processor (103) transfers this data from the Shared Memory Module (107) via a PCIe interface bus. Once the digital signal arrives at the Signal Processor Module (103), additional processing may occur followed by the data being streamed across the Data Bus (110) to the RF Front End Module (102). As shown in FIG. 1, the Data Bus (110) may be a high-speed serial interface that is compliant with the JESD204B protocol; however, other implementations compliant with other protocols are easily interchangeable.

Notwithstanding the foregoing, in alternative embodiments of the present invention, the AIRT system (100) might not include a signal processor, such as the Signal Processor Module (103). One such implementation is described in FIG. 8. In such alternative embodiments, the signal processing functionality described herein as being performed by the Signal Processor Module (103) may instead be performed by the High-Performance Computing (HPC) Processor (105). Moreover, in such alternative embodiments, the data transfer functionality (e.g., the transfer of digital signal data to the Shared Memory Module (107) and/or to the Data Recorder Module (124)) described herein as being performed by the Signal Processor Module (103) may instead be performed by the RF Front End Module (102).

Data Record Module 124

The AIRT implementation described herein may have the ability to perform high-speed data recording of the digital signal data via the Data Bus (123) to the Data Recorder Module (124). The data recorder module typically contains a firmware implementation to allow for data to be written to an external set of non-volatile storage media without using the HPC Processor Module to perform any data transfer operations.

High Performance Computing Processor 105

In exemplary embodiments, the High-Performance Computing (HPC) Processor (105) is a System on a Chip (SoC), System on a Module (SoM) and/or multiple discrete processors typically including multiple CPU cores, a multi-core GPU, and a shared memory interface between the GPU and CPU cores. The choice of utilizing the CPU or GPU is specific to the algorithm being used, as some algorithms are better for CPUs and some are better for GPUs. The following subsections describe the individual modules of the HPC Processor (105).

Shared Memory Module 107

The usage of the Shared Memory Module (107) allows for RF signal data to be efficiently shared between the CPU and GPU. Namely, the shared memory allows for the number of data transfers between the CPU and GPU to be minimized, which increases the overall DSP or ML application's throughput and reduced latency.

Multi-Core CPU 106

The SDR, DSP, or ML applications may process the RF signal data using the onboard Multi-Core CPUs (106). That is, DSP and/or ML computations may be performed on the CPU if appropriate for the desired algorithm. These CPUs typically have direct access to the Shared Memory Module (107). These CPUs may also be used to implement command and control software for the Radio Communication Module (121) as well as facilitating logic for other subsystems to include the Communication Interface (118) and the RF Subsystem (122).

General Purpose Graphics Processor Unit (GPU) 108

The General-Purpose Graphics Processor Unit (108) may be used by various applications for SDR, DSP, and/or ML algorithm computations. That is, DSP and/or ML computations may be performed on the GPU if appropriate for the desired algorithm. The GPU is desirable when highly parallelizable computations are to be performed on the digital signal data. In particular, GPUs have been demonstrated to be the most effective current technology to execute ML algorithms. Here, the GPU may be used to directly execute DSP, ML, and/or a combination of DSP and ML algorithms. In addition to performing DSP and/or ML computations, the GPU Multi-Core Processor (108) may be utilized to render data for the Display Module (106).

Radio Communication Module 121

The Radio Communication Module (121) typically performs the command and control of the Radio Frequency Subsystem (122). Typically, the Radio Communication Module (121) resides on the HPC processor and utilizes digital buses to send and receive commands to the RF Front End (102) subsystem, Signal Processor (103), and Timing Unit (104). The Radio Communication Module (121) may set parameters such as the frequency, bandwidth, filters, or any other parameter on the RF Front End Module (102). The Radio Communication Module (121) controls the ability to start/stop the Data Recording Module (124), via communications through the Signal Processor Module (103), as well as any other setting associated with the Signal Processor Module (103). The Radio Communication Module (121) may send and/or receive data across the Digital Bus (111) to communicate with the Timing Unit (104).

Display Module 106

The Display Module (106) connects to the GPU Multi-Core Processor Module (108) via the Display Interface (116). By executing SDR, DSP, and/or ML applications on the GPU Multi-processor (108), the data to be displayed can be shared with graphics rendering applications without the need for additional CPU involvement (thus eliminating additional memory transfer operations, which are undesirable in high performance systems).

Communication Interface Module 118

The Communications Interface Module (118) is used for communications between the HPC Processor Module (105) and external devices, such as networked computers, input devices, other video adapters, serial communications, etc. Because command and control of other subsystem modules within the AIRT system is typically executed by the HPC Processor Module (105), the Communications Interface Module (118) serves as the launching point for user access to the AIRT system. The interfaces within the Communication Interface Module (118) described herein may be USB, Ethernet, SATA, or the like.

AIRT Software Implementation

FIG. 2 outlines an exemplary AIRT system software stack associated with the command and control, signal processing, and data flow herein. Although FIG. 2 describes each component as various discrete physical components, the invention presented herein could combine the functionality of these components into a subset of the shown devices. The first layer (201) outlines the firmware residing on the physical devices associated with the AIRT system. These physical devices include the RF Front End Module, Timing Unit Module, Signal Processor Module, and the Data Recorder. This firmware resides on each of the physical devices, previously outlined in FIG. 1, and is used to enable control of various device parameters, memory management, processing, and other configurable options associated with the physical devices of the AIRT system herein. The Operating System Layer (202) contains the operating system associated with the AIRT system which may be Unix, Linux, Windows, Mac OS, or any other operating system. This layer provides the software implementation with certain infrastructure such as memory management and process scheduling functionality.

Following the Operating System Layer (202) is the Driver Modules Layer (203), which is built on top of a framework provided by the operating system. This layer allows for applications to communicate with various physical devices such as those specified previously in FIG. 1. In exemplary embodiments, devices enabled by the Driver Modules (203) are grouped together by the type of interface they utilize, such as Serial Peripheral Interface (SPI), Universal Software Bus (USB), Ethernet, Peripheral Component Interconnect express (PCIe), and/or Serial. The Data Bus may be PCIe or another high-speed bus to transfer data from the Radio Frequency Subsystem (122) to the HPC Process (105) via Data Bus (125). Additionally, the Driver Modules (203) include a module to communicate with the GPU Multi-Core Processor (108).

Above the Driver Modules Layer (203) is the User Libraries Layer (204) where the SDR library resides. The SDR library includes mechanisms to perform DSP of the digital RF data on the multi-core CPUs. Additionally, contained in the User Libraries Layer (204) is the Radio Communication library used to command the various physical devices associated with the RF signal chain (e.g., the RF Front End (102), the Signal Processor (103), etc.). That is, the Radio Communication library abstracts and encapsulates the various device drivers used to communicate with the physical devices involved with RF processing. These libraries may be written in C, C++, Python, Java, or any other suitable programming language.

Additionally, the User Libraries Layer (204) contains a GPU Acceleration Library allowing for programming of the GPU Multiprocessor hardware for executing computations on the digital RF data. Built on top of the GPU Acceleration Library resides two additional user libraries to allow for specific ML and DSP algorithms to be computed on the GPU's hardware. These libraries may be written in C, C++, Python, Java, or any other suitable programming language.

The top layer within the AIRT system's software stack is the User Application Layer (205) where the user may create and/or use custom applications to perform SDR, DSP and/or ML computations on the digital RF data. In order to accomplish this, the User Application Layer (205) leverages the User Libraries Layer (204) and combines these libraries in different ways to achieve a specific ML or DSP goal.

Signal Processor Module Implementation

The Signal Processor Module for the system described herein may be implemented on a field programmable gate array (FPGA), an application specific integrated circuit (ASIC), or some other type of digital processor. Additionally, the Signal Processor Module may be combined with other modules into a single SoC. In exemplary embodiments, the Signal Processor Module is implemented on an FPGA processor.

Signal Processor External Interfaces

FIG. 3 outlines an exemplary firmware implementation that is representative of the AIRT system's Signal Processor Module. The RF Front End Module (102) is directly connected to the Antenna Unit (301) via an analog RF cable for transmitting and receiving signals into and from the RF environment. Additionally, there may be other RF hardware (power amplifiers, attenuators, tuners, etc.) between the Antenna (301) and the RF Front End (102). Within the RF Front End Module (102) a received signal is sent to the Analog Signal Processor (316), streamed to the Analog to Digital Convertor (ADC), and streamed to the Signal Processor Module (103) via a Data Bus (110-1). The Analog Signal Processor (316) configuration may support direct sampling, direct conversion, superheterodyne, dual conversion superheterodyne, or any other digital receiver class.

A signal to be transmitted is typically sent from the Data Bus (110-1) to the Digital to Analog Convertor (DAC), streamed to the Analog Signal Processor (317), and send to the RF Antenna (301). In exemplary embodiments, the Data Bus (110-1) and Data Bus (110-2) are both a JESD204B serial data bus. The Analog Signal Processor (317) configuration may support direct sampling, direct conversion, superheterodyne, dual conversion superheterodyne, or any other digital receiver class.

FIG. 3 shows the Timing Unit Module (104) that typically provides the Signal Processor Module (103) with synchronization signals used for the Signal Processor Module's (103) clocks. In the event that GPS is available and GPS is being used to discipline the various clocks on the system, the Timing Unit (104) may provide GPS time to the HPC Processor (105). The HPC Processor (105) then may transmit this timestamp to the Signal Processor Module (103) to synchronize its internal time. The internal time on the Signal Processor Module (103) is then used to timestamp the RF data. If the Signal Processor Module's internal time was previously synchronized by the HPC Module (105), this time is typically GPS time. Otherwise, the timestamp provided may simply be a counter of elapsed time since the unit was powered on. In either case, the time stored in the Signal Processor Module (103) can be used to dictate when certain RF operations (e.g., transmission or reception of a signal) are to take place. If the Signal Processor Module's internal time was previously synchronized by the HPC Module (105), the time of such commands can be an absolute "wall clock" time. Otherwise, all timed commands may be relative to the time the unit was powered on.

The Timing Unit (104) also provides a reference clock signal to the Signal Processor Module to allow for phase synchronization between the Signal Processor Module (103), the Timing Unit (104), and the rest of the AIRT modules. If the Timing Unit (104) is synchronized to the GPS constellation, these reference signals will typically be synchronized to the GPS constellation and GPS time is provided to the HPC Module (105).

FIG. 3 outlines the connectivity of the Signal Processor Module (103) to the external Recorder Interface (124). This interface is used to connect the Signal Processor Module (103) to non-volatile storage media for high-speed recording of digital RF signal data. The Recorder Interface (124) is connected to the Signal Processor Module (103) via a Data Bus (123) which may be 10 gigabit Ethernet, SATA, SAS, Infiniband, USB-C, or any other data transfer protocol capable of high bandwidth streaming.

FIG. 3 also outlines the Data Bus (125) for sending and receiving RF digital signal data to and from the HPC Processor (105). In exemplary embodiments, the Data Bus 125 and Data Bus 224 are PCI Express.

RF Front End Interface Subsystem 305

In exemplary embodiments, the RF Front End Interface Subsystem (305) includes a Data Bus (110-1) for receiving data from the RF Front End Module (102) and a Data Bus (110-2) for sending data to the RF Front End Module (102). The RF Front End Interface Subsystem (305) typically includes a PHY Module (312). In exemplary embodiments, the PHY Module (312) is a JESD PHY containing serializer/deserializer (SERDES) transceivers, one for each lane of the Data Bus (110-1).

The RF Front End Interface Subsystem (305) typically contains a Receiver (RX) Core (313). In exemplary embodiments, the RX Core (313) is a JESD RX Core and has a single AXI4 stream interface for all lanes. Additionally, initial lane alignment (ILA) capture, descrambling, and alignment character detection and replacement logic functions are performed by the RX Core (313) for each lane of the bus. Common logic of the RX Core (313) for all lanes includes local multi-frame clock state machine, a SYNC/SYSREF interface, and error counters for each lane of the bus.

The RF Front End Interface Subsystem (305) also typically contains a Transmitter (TX) Core (314). In exemplary embodiments, the TX Core (314) is implemented as a JESD TX core and it accepts user data over and AXI4 stream interface. In exemplary embodiments, the following logic functions are performed by the TX Core (314) per TX lane: scrambling, alignment character insertion, and initial lane alignment (ILA) sequence generation. Common logic for all lanes includes control, state machine, and SYNC/SYSREF interface, random pattern generators (RPAT) and scrambled jitter pattern (JSPAT) pattern generators, and AXI lite management interface and control/status registers.

DSP/Interface Subsystem 308

In exemplary embodiments, the Signal Processor Module (103) contains a DSP/Interface (308) to perform additional signal processing on either the transmitter and/or receiver signal and also provides the glue logic and buffering between the RF Front End Interface Subsystem (305), RX (313), and TX (314) logic and the PCIe DMA bridge subsystem (307). The Signal Processor Module (103) also typically includes control/status registers, and a serial interface (126) to communicate with the Radio Communication Module (121) found on the HPC Processor Module (105). Signal processing functions that may be performed by the Signal Processor Module (103) include, but are not limited to, channelization, equalization, timing synchronization, DC bias removal, I/Q imbalance correction, and automatic gain control.

High Speed Data Recording Subsystem 306

The Signal Processor Module (103) may feed a High-Speed Data Recording Subsystem (306) containing firmware for sending data to the Recorder Interface (124) via a Data Bus (123). The High-Speed Data Recording Subsystem (306) converts the data streamed from the DSP Interface (308) to the protocol facilitated by the Data Bus (123) and the Recorder Interface System (124). This particular implementation of a data recording subsystem allows for the recording of the digital RF signal data to bypass the HPC Processor Module (105) with the goal of reducing the processing demands on the HPC Processor (105). This recording of signal data may be performed simultaneous with the transfer of the same signal data to the HPC Processor Module (105) for processing.

The High-Speed Data Recording Subsystem (306) may also play previously recorded data back through the AIRT System by sending the recorded samples from the Recorder Interface (124) through the Data Bus (123) to the High-Speed Data Recording Subsystem (306), then to the DSP Interface Module (308). This signal playback capability of the High-Speed Data Recording Subsystem (306) functions without requiring any direct intervention by the HPC Processor Module (105).

PCIe-DMA Bridge Subsystem 307

In exemplary embodiments, the PCIe DMA Bridge Subsystem (307) masters read and write requests on the Integrated PCIe (310) which enable direct memory transfers, both Host to Card (H2C), and Card to Host (C2H). It implements a high performance, configurable DMA controller. Memory transfers are specified on a per channel basis. That is, DMA transfers occur independently to/from HPC Processor Shared Memory (107) for each RF TX and RX channel.

The digital RF data is transferred from the DSP/Interface (308) across the AXI Streaming DMA Engine (315) to the PCI Express address space on the Integrated PCIe Subsystem (310). The interrupts for PCIe are generated by the IRQ Module (311).

Integrated PCIe Subsytem 310

In exemplary embodiments, the Integrated PCIe Subsystem (310) implements a PCIe Bus Master endpoint that complies with the PCI Express Base specification, rev.2.1. It follows the layering model outlined in the aforementioned specification which includes Physical, Data Link, and Transaction layers. Packets are used to exchange information between the layers. Packets are formed in the Transaction and Data link layers to carry information from the transmitting component to the receiving component. The packets are mapped to the four serial lanes and connected to the transceivers which are connected to the PCIe bus. Functions provided by the core include generating and processing of transaction layer packets (TLPs), flow control management, initialization and power management, data protection, error checking and retry functions, physical link interface initialization, maintenance and status tracking, serialization, deserialization, and support circuitry for interface operation. The data interface is an AXI4 streaming interface which is connected to the PCIe DMA Bridge Subsystem (307).

Shared Memory Implementation for Digital RF Signal Processing

A key factor in the implementation of a high throughput SDR system using a GPU is the ability to minimize data transfers between various subsystems. Previous implementations of GPU based SDR systems required many memory copy operations in order to transfer data between the RF subsystem (e.g., the RF Front End and an FPGA or other signal processor), the CPU, and the GPU. The GPU based SDR system described herein utilizes a unique shared memory data transfer approach to minimize these memory operations. Additionally, FIG. 8 describes an implementation of the AIRT where the Signal Processor Module (103) is removed and the RF Front End (102) is directly connected to the HPC Processor (105) which will further reduce the number of copies and further reduce the system latency.

Shared Memory Mechanism for RF Signal Processing

Referring to FIG. 4, when the AIRT system is receiving signals, the Signal Processor Module (103) typically is running a Data Bus Receiver Subsystem (403). In exemplary embodiments, the Data Bus Receiver Subsystem (403) is implemented as a PCIe DMA Subsystem. The Data Bus Receiver Subsystem (403) typically combines consecutive digital samples into sample sets for transferring across the Data Bus (405) to the CPU/GPU Shared Memory Module (107). That is, consecutive digital samples are grouped together into a block that are processed together and associated metadata regarding the samples may be attached to the block as well. In exemplary embodiments, the Data Bus (405) is a PCIe bus. The term Shared Memory is used herein to refer to memory that is equally accessible between a CPU and GPU subsystem.

Within the CPU/GPU Shared Memory Module (107), a Receiver Application Buffer (408) is typically created. In exemplary embodiments, this Receiver Application Buffer (408) is shown as a Ring Buffer where each block of the buffer is a data buffer itself, which may contain either strictly RF samples, metadata (e.g., timestamps, signal parameters, etc.), or a combination therein. As a result, sizes of these blocks need not be consistent. The Receiver Application Ring Buffer then establishes a relationship between blocks such that there is an ordering of which block should be written to first, second, third, etc. Once the final block is written to, the first block is written to again, therefore establishing a "ring" of blocks. This relationship is typically shared with the Signal Processor Module (103) so it knows where to write the data to. Additionally, the Signal Processor Module (103) is also typically provided a size for each block (because block sizes need not be consistent) as well as information regarding whether the memory block is meant to contain metadata, RF signal data, or a combination therein. Although the exemplary embodiment shown in FIG. 4 depicts the Signal Processor Module (103) transferring the data to the Receiver Application Buffer (408), the RF Front End (102) module may directly send the RF signal data to the Receiver Application Buffer (408), bypassing the Signal Processor (103).

Note that in most cases the "block size" will be greater than the DMA transfer size. As a result, in order to transfer a data set and/or the associated metadata, several smaller DMA transfers may be taking place. This is due to the fact that DMA transfer size may be chosen in order to maximize interface throughput, while data set or block size is typically chosen such that each block represents an iteration of processing performed on the HPC Processor Module (105).

Referring to FIG. 4, once writing of the data set from the Data Bus Receiver Subsystem (403) to the associated block on the Receiver Application Buffer (408) has completed, the Buffer Application Programming Interface (API) (410) may access the memory block for computation utilizing either the CPU or GPU. The User Application Layer (205) typically has access to this CPU/GPU shared memory in the ring buffer. Because the block's physical memory is shared, the GPU can access this data directly without additional CPU involvement. Due to the concurrent nature of memory accesses on the Receiver Application Buffer (408) (e.g., the Signal Processor (103) is typically writing while the HPC Processor Module (105) is reading), the Data Bus Receiver Subsystem (403) typically signals to the Buffer API (410) that the data is ready to be processed. Additionally, processing by the Buffer API (410) typically should be completed prior to the block being written to again by the Data Bus Receiver Subsystem (403), otherwise the data will be corrupted. This race condition may be alleviated in the implementation of the Receiver Application Buffer (408) by either blocking the Data Bus Receiver Subsystem (403) from writing when data is being accessed by the Buffer API (410) (which might force the Signal Processor (103) to drop data) or by simply sizing (e.g., by predefining the size of) the Receiver Application Buffer (408) to reduce the risk of overwriting the data (e.g., with block sizes tailored to speedy, efficient processing and creating a large ring buffer of several blocks). Note that the "blocking" operation may be performed by having the HPC Processor Module (105) signal to the Signal Processor (103) that a particular memory block is being operated on.

The AIRT system described herein has the ability to utilize the GPU/CPU Shared Memory Module (107) to allow the Buffer API (410) to send signal data to be transmitted to the Signal Processor (103) with maximum throughput. FIG. 4 illustrates this methodology, showing that the Buffer API (410), which may interface with various user applications performing DSP and/or ML computations, allocates a memory block on the Transmitter Application Buffer (409) as shown. In exemplary embodiments, this Transmitter Application Buffer (409) is shown as a Ring Buffer. As in the case of the Receiver Application Buffer (408), each block may contain RF sample data, metadata, or a combination therein. Also, (once again analogous to the memory transfers involved with Receiver Application Buffer (408)), there are considerations with respect to concurrency. Namely, the Buffer API (410) typically signals to the Data Bus Transmitter Subsystem (404) when data is available. For the example provided here, the Data Bus Transmitter Subsystem (404) is implemented as a PCIe DMA subsystem. Also, the underlying DMA transfer(s) typically should be completed by the time the block is written to again by the Buffer API (410), otherwise the data may be corrupted. This is less of a concern than in the case of the Receiver Application Buffer (408), because the Signal Processor (103) does not perform any computations on this data block. Instead, the Signal Processor (103) simply transfers the data across the data bus before the block is written to again.

Receiver Shared Memory Algorithm Implementation

FIG. 5 describes an exemplary algorithm used to allocate and execute the shared memory mechanism to maximize throughput in the AIRT system when operating in receiving mode. This process is outlined for the case where a Signal Processor Module (103) is implemented, however the processes implemented on the Signal Processor Module (103) in FIG. 5 may be placed within the RF Front End (102) to eliminate the need for the Signal Processor Module (103) as shown in FIG. 9. For simplicity, the receiver shared memory algorithm implementation will be described with the Signal Processor Module implemented, but one having skill in the art will understand that the implementation depicted in FIG. 9 with the Signal Processor Module's (103) operations placed in the RF Front End Module 102 will operate in substantially the same manner.

The process begins at block 504 with the HPC Processor Module (105) allocating X memory blocks with each block containing enough bytes to either hold N RF samples, metadata, or a combination thereof. A collection of consecutive RF samples, metadata, or a combination thereof is referred to herein as a "block".

Several blocks are allocated at once and a relationship is maintained between the blocks in terms of their ordering. For example, block Z is defined as being "first", block Z+1 is defined as being "second", etc. Once this ordered list of blocks ends, it starts again with the first block, therein creating a circular or "ring" relationship. As a result, this implementation is referred to a "ring buffer".

Each block's physical address in memory is noted and all of these addresses are combined into a single list, which is sent to the Signal Processor Module (103) and stored on the Signal Processor Module (103) according to block 506. Note that any conversion to obtain physical memory addresses (e.g., in the instance that the operating system is providing a virtual memory subsystem) is done in block 505. Also contained in the list may be the size of each block, since this size may or may not be consistent from block to block (e.g., in the event that one block contains only metadata whereas another block contains only RF samples) as well information about what type of data should be contained in the block (e.g., RF samples or metadata). Once the transfer of the address list has successfully executed, an acknowledge flag is typically sent to the HPC Processor Module to trigger the Start Processing Application block (507). That is, the acknowledgement serves as a mechanism to let the application know that the memory initialization has successfully completed and that processing can begin.

Once the buffer has been initialized and the application processing is launched according to block 507, RF signal data and metadata processing can take place. For RF signal data, each RF digital sample is typically streamed from the RF Front End Module (102) to the Signal Processor Module (103) and written to a buffer (e.g., a buffer that has a size equal to the current block of the ring buffer) on the Signal Processor Module (103). This is shown in FIG. 5 as the process of going from block 508 to block 509. As shown in blocks 509 and 510, the buffer on the Signal Processor Module (103) continues to accumulate data until the buffer is full. Once this buffer is full, the algorithm transitions to block 511 where DMA transfers are initiated and the set of samples is sent to the HPC Processor Module (105). In some embodiments the DMA transfers may take place while the buffer is accumulating data (e.g., if the DMA transfer size is smaller than block size and it is undesirable to wait for the buffer to fill before starting any data transfer operation). The algorithm then notes that the entire memory block has been transferred (which may be one or many DMA transfers, based on the relationship between DMA transfer size and block size) and increments its position in the list of physical addresses that were previously stored via the operations in block 506 (this is shown in FIG. 5 as block 512). In some embodiments, the buffer on the Signal Processor Module (103) might only be large enough to store enough data to support a single DMA transfer and not an entire memory block. In such embodiments, the Signal Processor Module (103) may wait for multiple of such transfers to occur (e.g., enough DMA transfers to fill the current block of the ring buffer) before incrementing its position in the list of physical addresses.

The algorithm returns to block 509 and begins filling up the buffer again with data streaming from the RF Front End Module (102). Additionally, the data from the set sent to the HPC Processor Module (105) is processed as shown in block 513. Because the algorithm will typically return to block 509 to fill the Signal Processor Module's (103) buffer with new samples, this process may continue indefinitely or until the program is terminated by the user application.

If desired for the application, metadata can be written by the Signal Processor Module (103) either as part of a transfer of RF signal data (e.g., right before block 511 in FIG. 5, metadata is added to the memory block), or by simply transferring metadata in a separate memory block. In this instance, the Signal Processor Module (103) simply notes that the memory block is meant for metadata, writes the metadata to the block, and then transfers the metadata to the HPC Processor Module (105). In order to simplify FIG. 5, these metadata operations are not shown in the figure.

Transmitter Shared Memory Algorithm Implementation

FIG. 6 illustrates an exemplary process used to allocate the ring buffer and perform memory transfers in the AIRT system when operating in transmitting mode.

Referring to FIG. 6, the algorithm begins with block 604 by allocating X blocks of memory each sized to either hold N RF samples, metadata, or a combination thereof. Once this occurs, the algorithm proceeds to block 605 where any conversion of memory addresses to physical addresses is performed (e.g., if the operating system is running a virtual memory subsystem). The physical address for each of the memory blocks are typically combined into a list and sent to the Signal Processor Module (103) as shown in block 606, where the list is stored in memory on the Signal Processor Module (103). However, as described above with respect to FIG. 5, the processes implemented on the Signal Processor Module (103) in FIG. 6 may be placed within the RF Front End (102) to eliminate the Signal Processor Module (103) as shown in FIG. 10. For simplicity, the transmitter shared memory algorithm implementation will be described with the Signal Processor Module implemented, but one having skill in the art will understand that the implementation depicted in FIG. 10 with the Signal Processor Module's (103) operations placed in the RF Front End Module 102 will operate in substantially the same manner.

Note that as previously discussed with respect to the receiver shared memory algorithm implementation, an ordered relationship between memory blocks is maintained such that the blocks are combined into a single buffer. Also, as previously discussed, this list contains the size of each block, since block size may vary from block to block, as well as information regarding what type of data (e.g., signal data, metadata, or a combination thereof) is stored in the block. Once the list of physical addresses for the memory blocks is stored on the Signal Processor Module (103), the algorithm proceeds to block 607 where the processing application is started. Once the application is started, the user defined application processes and/or creates the signal data and/or metadata in block 608 followed by sending the data segment to block 609 where the data segment is written to the current memory block in the ring buffer. Following the logic in box 609 and 610, this process is repeated until the current memory block is full.

Referring to block 610 of FIG. 6, once enough segments of signal data and/or metadata have been written to the current memory block to fill it, the loop continues on to block 611 where the current memory block is retrieved by the Signal Processor Module (103) across the data bus and written to memory on the Signal Processor Module (103) as shown in block 612. This is accomplished via one or more DMA transfers. Continuing on the Signal Processor Module (103) algorithm path, if the memory block contains signal data, the signal is then sent to the RF front end in block 613, further processed by the RF Front End Module, and finally transmitted out of the SDR system (block 614). If the block contains metadata, the Signal Processor Module (103) can use this data as needed by the algorithm being employed. Note that for the purpose of simplifying FIG. 6, this metadata processing is not shown in FIG. 6.

Referring back to the HPC Processor Module (105) section of the algorithm, once block 611 executes successfully, the ring buffer moves onto the next memory block. Afterwards, the algorithm typically returns to block 609 and continue writing the next data segment to the new memory block. This may continue indefinitely or until the user application cancels the process.

Collecting Training Data and Deployment on Same Architecture

One of the components of a machine learning system is the training data. Fundamentally, machine learning algorithms utilize training data and a known desired output to perform algorithm training. During this training process, a set of training data is fed through an untrained machine learning algorithm and the difference between the calculated output and the desired output is measured. Based on this error, the various parameters in the machine learning algorithm are continuously modified until the desired output is achieved. Once the ML algorithm converges in this way, the algorithm is said to be trained.

The trained network's job is then to receive new and never before seen data and calculate the result based on the trained algorithm's implementation. This process of ingesting new data is referred to as inference. If poor training data was used, or the training data does not accurately describe the environment in which the inference is occurring, the trained ML algorithm may not function properly.

Every RF system is somewhat unique due to manufacturing tolerances (i.e., it is not possible to produce exact "clones" of RF components). While the macro properties of two identically manufactured parts are the same; some aspects, such as spurs, transients, and phase noise, will not be identical. This phenomenon has even led to the desire to try and identify individual RF components by their unique RF fingerprint.

Two RF front end transceivers that were identically manufactured will therefore have intrinsically different RF signals at some level. Because of this, performing inference on System A while using a machine learning algorithm that was trained via data obtained from System B may cause the inference algorithm to perform poorly.

Additionally, when the spectral environment changes, the ML algorithm may see performance degradation due to not being previously trained on the new spectrum. Accordingly, the ML algorithm may be periodically updated, likely using transfer learning or some other kind of online learning, e.g., reinforcement learning.

The AIRT system presented herein solves this problem by creating a closed loop architecture capable of both recording machine learning training data and performing machine learning inference. Because the training data may be obtained on the exact system in which the inference will occur, this increases the likelihood of successfully deploying a machine learning RF system and the ability to update the algorithm during inference. This is particularly relevant when the ML algorithm is to measure for differences in the environment between what it sees "live" (e.g., during inference) and what is present in the training data.

This process is illustrated in FIG. 7 where block 701 records the RF data on the AIRT system for the purpose of training a machine learning algorithm. The algorithm is trained on the recorded data in block 702 which may be an offline process not executed on the AIRT system. For example, the algorithm may be trained on a server or other computing system having a more powerful GPU than the GPU of the AIRT system, thereby facilitating quicker training of the algorithm. Once convergence occurs and the machine learning algorithm is considered trained, it will be compiled as shown in block 703, followed by the inference stage in the test environment (block 704). In the AIRT system presented herein, processes 701 and 704 typically occur on the exact same hardware.

CONCLUSION

This disclosure describes the unique implementation of a SDR system implemented using a radio frequency front end combined with or without a signal processor module and a high-performance computing (HPC) processor. The architecture of the system described herein is ideal for processing of highly parallelizable algorithms, such as digital signal processing and/or machine learning algorithms. Because this architecture is ideal for computation of machine learning algorithms, typically associated with artificial intelligence, on digitized RF signal data, the system described herein is referred to as the Artificial Intelligence Radio Transceiver (AIRT).

Additionally, the specific implementation described herein outlines a methodology to minimize the number memory transfers associated with transferring digital RF signals between processing modules, maximizing overall system bandwidth.

As will be appreciated by one of ordinary skill in the art, the present invention may be embodied as an apparatus (including, for example, a system, a machine, a device, a computer program product, and/or the like), as a method (including, for example, a computer-implemented process), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with software-defined radio systems and machine learning algorithms to be performed thereon.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer including object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broader invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:
1. A software-defined radio system, comprising:
 a radio frequency front end configured to transmit and receive signals;
 a high performance computing processor, the high performance computing processor comprising:
  a central processing unit;
  a graphics processing unit; and a shared memory accessible by both the central processing unit and graphics processing unit;

wherein the radio frequency front end is configured to send digital signal data directly to the high performance computing processor;

wherein the high performance computing processor is configured to (i) create a ring buffer comprising a plurality of blocks in the shared memory and (ii) transfer to the radio frequency front end a list of address of the plurality of blocks of the ring buffer; and wherein the radio frequency front end is configured to directly store the digital signal data in the ring buffer of the original shared memory of the high-performance computing processor.

2. The software-defined radio system of claim 1, wherein the radio frequency front end is configured to directly store the digital signal data in the shared memory of the high-performance computing processor.

3. The software-defined radio system of claim 1, wherein the radio frequency front end is configured to store, via Direct Memory Access (DMA) or Remote Direct Memory Access (RDMA), the digital signal data in the shared memory of the high-performance computing processor.

4. The software-defined radio system of claim 1, wherein the radio frequency front end and high-performance computing processor are embedded on a common printed circuit board and/or electronically interconnected using one or more high-speed buses.

5. A method of recording machine learning training data and deploying a machine learning algorithm, comprising:

receiving digital signal data via a software-defined radio system comprising:
 a radio frequency front end configured to transmit and receive signals;
 a high performance computing processor, the high performance computing processor comprising:
  a central processing unit;
  a graphics processing unit; and
  a shared memory accessible by both the central processing unit and graphics processing unit;
 wherein the radio frequency front end is configured to send the digital signal data directly to the high performance computing processor;
 wherein the high performance computing processor is configured to (i) create a ring buffer comprising a plurality of blocks in the shared memory and (ii) transfer to the radio frequency front end a list of address of the plurality of blocks of the ring buffer; and
 wherein the radio frequency front end is configured to directly store the digital signal data in the ring buffer of the original shared memory of the high-performance computing processor;

recording the digital signal data on a memory of the software-defined radio system;

training a machine learning algorithm using the recorded digital signal data; and performing, via the software-defined radio system, machine learning inference using the trained machine learning algorithm.

6. The method of claim 5, wherein the method further comprises transmitting a digital signal, wherein the digital signal is determined by the machine learning inference.

7. The method of claim 5, wherein the trained machine learning algorithm is updated during the performance of machine learning inference.

8. The method of claim 5, wherein the digital signal data is recorded on the shared memory accessible by both the central processing unit and the graphics processing unit.

9. The method of claim 5, wherein the radio frequency front end and high-performance computing processor are embedded on a common printed circuit board and/or electronically interconnected using one or more high-speed buses.

* * * * *